(12) United States Patent
Vlaar

(10) Patent No.: US 11,662,055 B2
(45) Date of Patent: May 30, 2023

(54) COUPLING AND COUPLING SYSTEM FOR SWIVABLY COUPLING AN ARM TO A POST, IN PARTICULAR FOR COUPLING A MONITOR ARM TO A SUPPORT

(71) Applicant: Vlaar Innovations B.V., Midwoud (NL)

(72) Inventor: Erik Jacobus Vlaar, Midwoud (NL)

(73) Assignee: VLAAR INNOVATIONS B.V., Midwoud (NL)

( * ) Notice: Subject to any disclaimer, the term of this patent is extended or adjusted under 35 U.S.C. 154(b) by 0 days.

(21) Appl. No.: 16/461,761

(22) PCT Filed: Nov. 16, 2017

(86) PCT No.: PCT/NL2017/050742
§ 371 (c)(1),
(2) Date: May 16, 2019

(87) PCT Pub. No.: WO2018/093256
PCT Pub. Date: May 24, 2018

(65) Prior Publication Data
US 2020/0003359 A1    Jan. 2, 2020

Related U.S. Application Data

(63) Continuation-in-part of application No. PCT/NL2016/050798, filed on Nov. 17, 2016.

(30) Foreign Application Priority Data

May 9, 2017  (NL) ..................................... 2018877

(51) Int. Cl.
*F16M 11/08*       (2006.01)
*F16M 11/20*       (2006.01)
(Continued)

(52) U.S. Cl.
CPC ......... *F16M 11/08* (2013.01); *F16M 11/2014* (2013.01); *F16M 11/22* (2013.01);
(Continued)

(58) Field of Classification Search
CPC .... F16M 11/08; F16M 11/2014; F16M 11/22; F16M 11/24; F16M 13/022; G06F 1/1601
(Continued)

(56) References Cited

U.S. PATENT DOCUMENTS 2,242,303 A * 5/1941 Irmischer ................ F21V 21/26
                                                              285/282
4,381,538 A * 4/1983 Warshawsky ........... F21V 21/26
                                                              362/269
(Continued)

FOREIGN PATENT DOCUMENTS

EP    1434076    6/2004
EP    2402619    1/2012
(Continued)

OTHER PUBLICATIONS

International Search Report from PCT/NL2017/050742 dated Feb. 27, 2018.
Office Action from EP App No. 17817241.7 dated Dec. 14, 2020.

*Primary Examiner* — Christopher Garft
*Assistant Examiner* — Michael McDuffie
(74) *Attorney, Agent, or Firm* — Adsero IP

(57) ABSTRACT

A coupling for swivably coupling an arm to a post, the coupling in use cooperating with the post as an engaged element via a post interface, and with the arm as an engaged element via an arm interface, wherein the coupling including its interfaces provides limited relative rotational movement between the arm and the post about a swivel axis extending along a longitudinal axis of the post, wherein the limited rotational movement is provided in a rotational zone that
(Continued)

corresponds to a single revolution about the longitudinal axis. The disclosure further relates to a coupling system, and to a monitor support.

11 Claims, 11 Drawing Sheets

(51) Int. Cl.
| | | |
|---|---|---|
| *F16M 11/24* | (2006.01) | |
| *F16M 11/22* | (2006.01) | |
| *F16M 13/02* | (2006.01) | |
| *G06F 1/16* | (2006.01) | |

(52) U.S. Cl.
CPC .......... *F16M 11/24* (2013.01); *F16M 13/022* (2013.01); *G06F 1/1601* (2013.01); *F16M 2200/022* (2013.01); *F16M 2200/066* (2013.01); *G06F 2200/1612* (2013.01)

(58) Field of Classification Search
USPC ......... 248/176.3, 274.1, 276.1, 282.1, 283.1, 248/288.31, 289.11, 917–924, 413, 415, 248/417, 418
See application file for complete search history.

(56) References Cited

U.S. PATENT DOCUMENTS

| | | | | |
|---|---|---|---|---|
| 4,518,139 A * | 5/1985 | Barfell | ............... | B60N 2/02 |
| | | | | 108/142 |
| 4,565,395 A * | 1/1986 | Rockwood | ............ | F16B 7/1427 |
| | | | | 248/415 |
| 4,576,501 A * | 3/1986 | McConnell | ........... | F16B 7/1472 |
| | | | | 248/413 |
| 4,605,995 A * | 8/1986 | Pike | ................... | F16M 11/2014 |
| | | | | 362/287 |
| 4,726,552 A * | 2/1988 | Warshawsky | ........... | F21S 6/002 |
| | | | | 248/122.1 |
| 4,821,159 A * | 4/1989 | Pike | ................... | F16M 11/2014 |
| | | | | 248/282.1 |
| 5,242,430 A | 9/1993 | Arenas | | |
| 5,655,741 A * | 8/1997 | Watkins | ................. | F16M 11/08 |
| | | | | 248/125.9 |
| 5,924,329 A * | 7/1999 | Moetteli | ................ | G05G 11/00 |
| | | | | 248/418 |
| 6,247,673 B1 * | 6/2001 | Bees | ...................... | F16M 11/10 |
| | | | | 248/123.11 |
| 6,378,830 B1 * | 4/2002 | Lu | ........................... | F16M 11/10 |
| | | | | 16/337 |
| 6,478,274 B1 * | 11/2002 | Oddsen, Jr. | ........ | F16M 11/2014 |
| 6,695,270 B1 * | 2/2004 | Smed | ..................... | F16M 11/10 |
| | | | | 248/274.1 |
| 6,779,767 B2 * | 8/2004 | Kuhn | ..................... | F16M 11/08 |
| | | | | 248/276.1 |
| 7,207,537 B2 * | 4/2007 | Hung | ..................... | F16M 11/10 |
| | | | | 248/274.1 |
| 7,384,021 B2 * | 6/2008 | Liao | ........................ | F16M 11/22 |
| | | | | 248/415 |
| 8,162,271 B2 * | 4/2012 | Li | ........................ | F16M 11/105 |
| | | | | 248/162.1 |
| 8,469,323 B1 * | 6/2013 | Deros | ................... | F16M 11/105 |
| | | | | 248/123.11 |
| 8,602,366 B2 * | 12/2013 | Chen | .................... | F16M 11/046 |
| | | | | 211/206 |
| 10,851,938 B2 * | 12/2020 | Glickstein | ............. | F16M 11/16 |
| 2003/0156891 A1 * | 8/2003 | Hung | ..................... | F16C 11/10 |
| | | | | 403/84 |
| 2005/0092876 A1 * | 5/2005 | Carnevali | ............. | F16M 11/40 |
| | | | | 248/160 |
| 2007/0181768 A1 * | 8/2007 | Choi | ..................... | F16M 11/08 |
| | | | | 248/415 |
| 2007/0295878 A1 | 12/2007 | Smed | | |
| 2015/0129731 A1 * | 5/2015 | Podlin | .................... | F16M 11/08 |
| | | | | 248/289.11 |
| 2015/0366627 A1 * | 12/2015 | Oginski | ................. | A61B 90/50 |
| | | | | 248/288.11 |
| 2016/0032973 A1 | 2/2016 | Dreizler | | |
| 2017/0290725 A1 * | 10/2017 | Oginski | ................. | F16M 11/08 |
| 2018/0228680 A1 * | 8/2018 | Oginski | ............. | F16M 13/027 |
| 2018/0372261 A1 * | 12/2018 | Vlaar | .................... | G06F 1/1601 |

FOREIGN PATENT DOCUMENTS

| | | | |
|---|---|---|---|
| NL | 6503946 | 10/1965 | |
| NL | 2015811 B1 * | 6/2017 | .......... F16M 13/022 |
| WO | WO 2017/086783 | 5/2017 | |

* cited by examiner

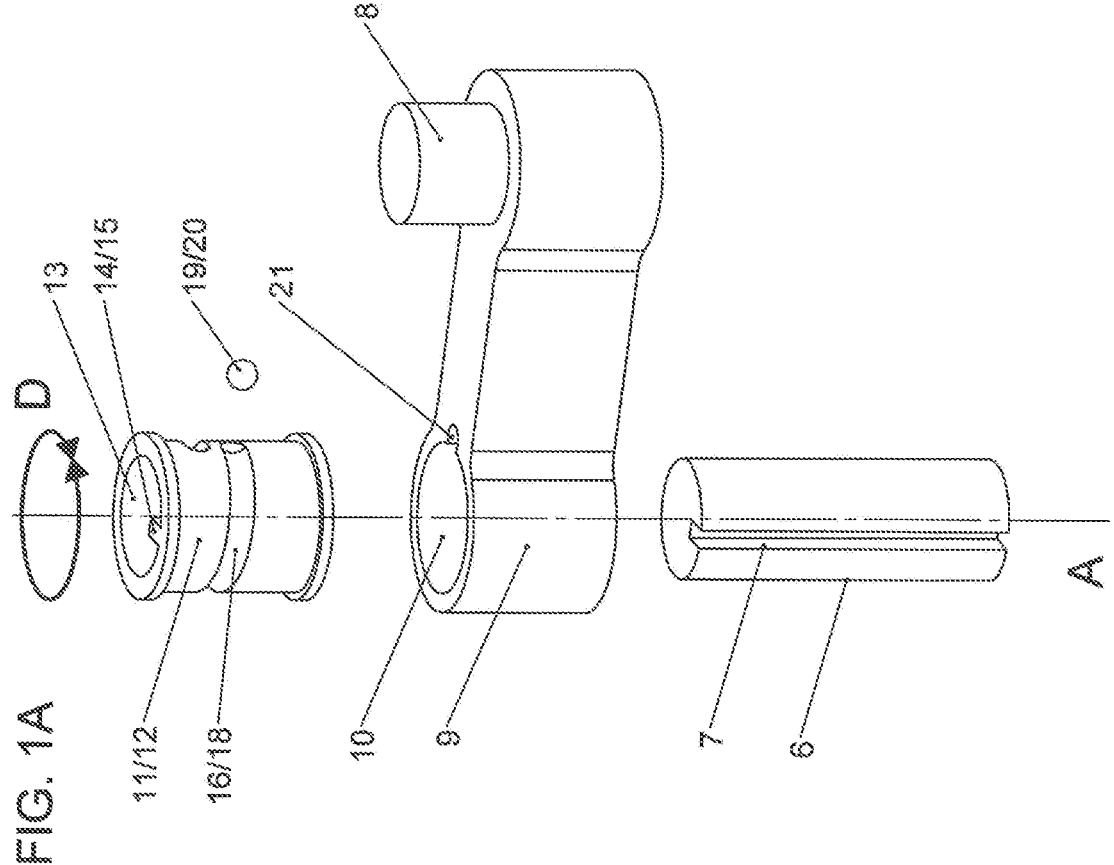

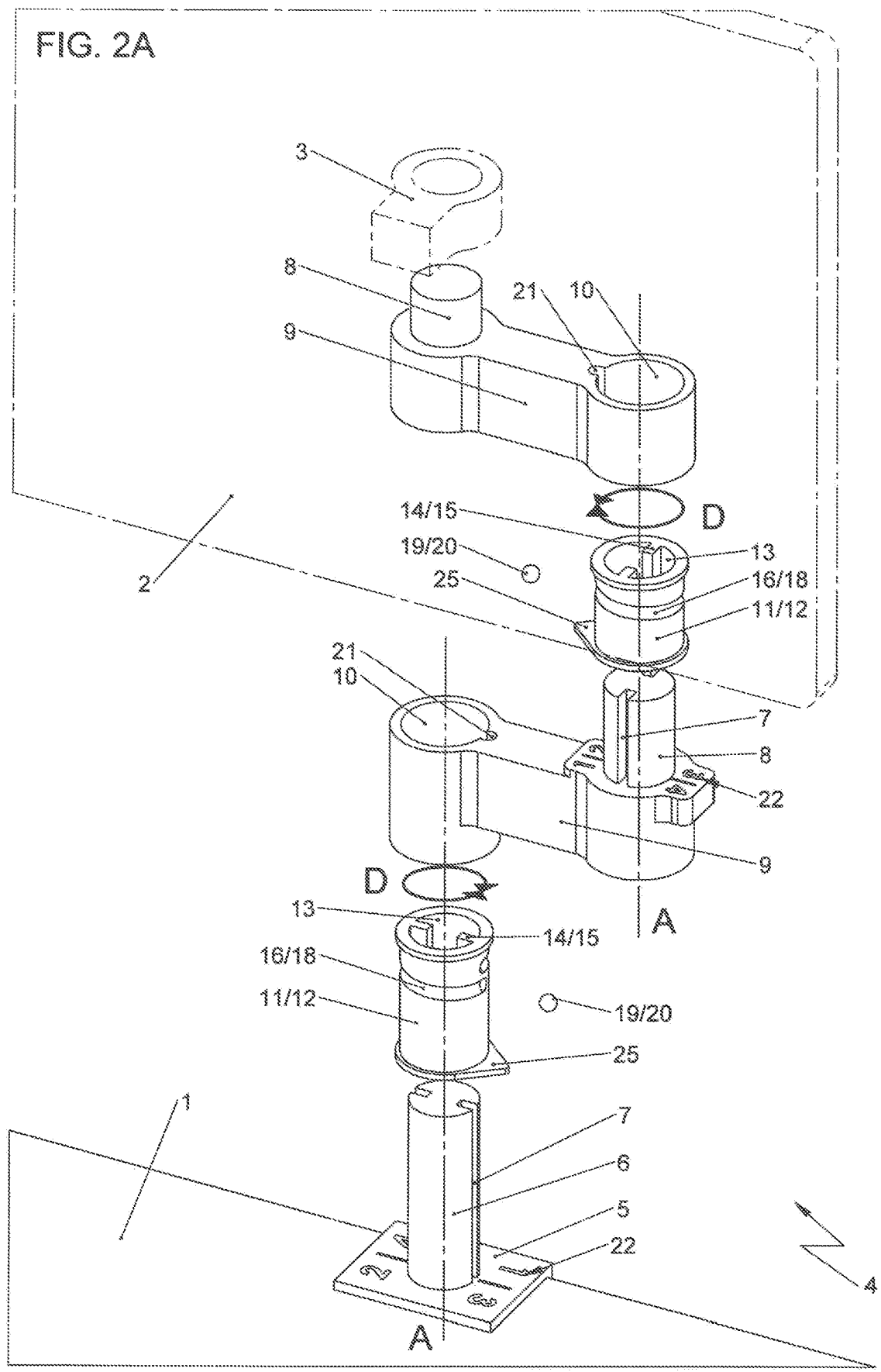

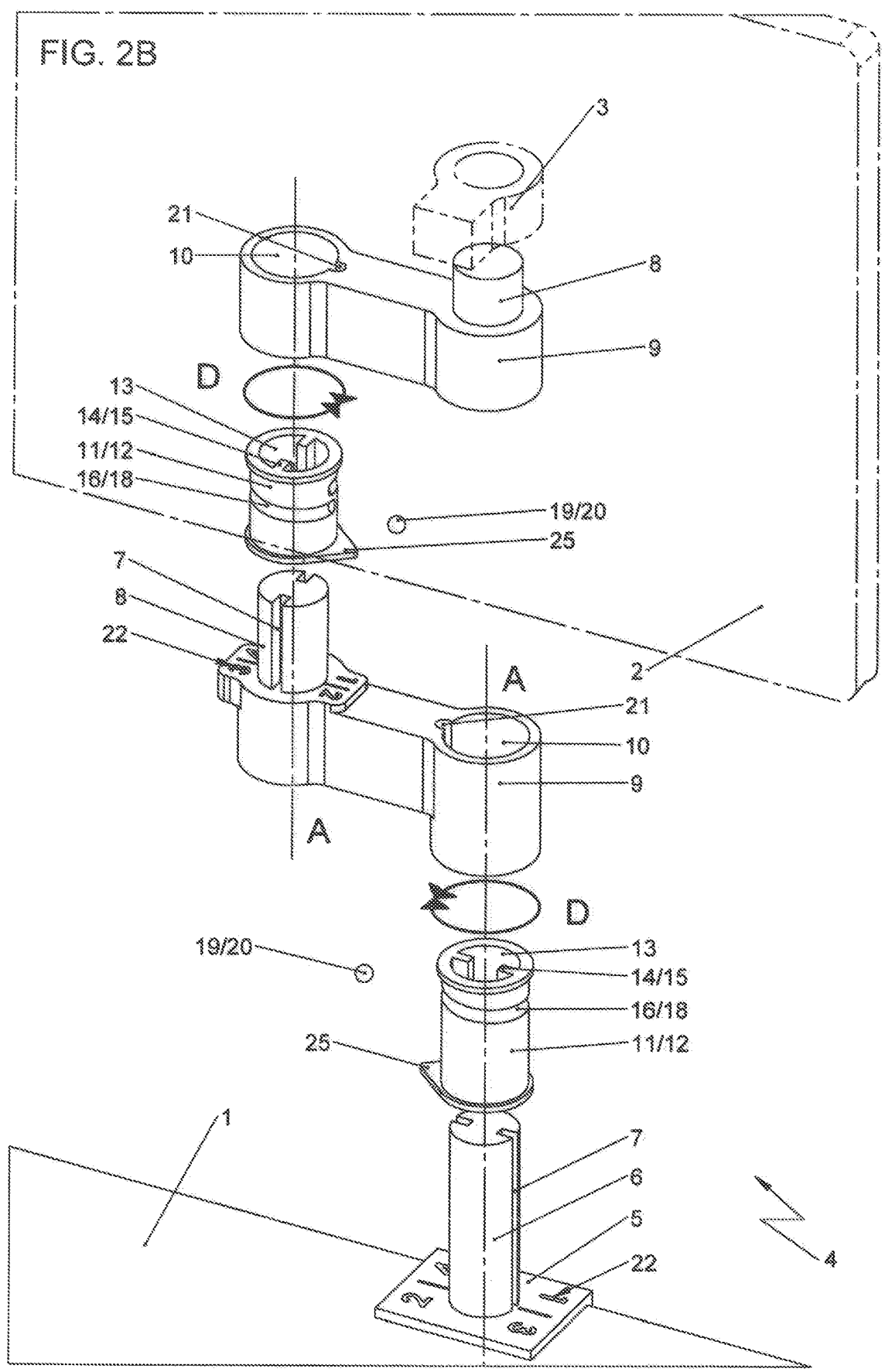

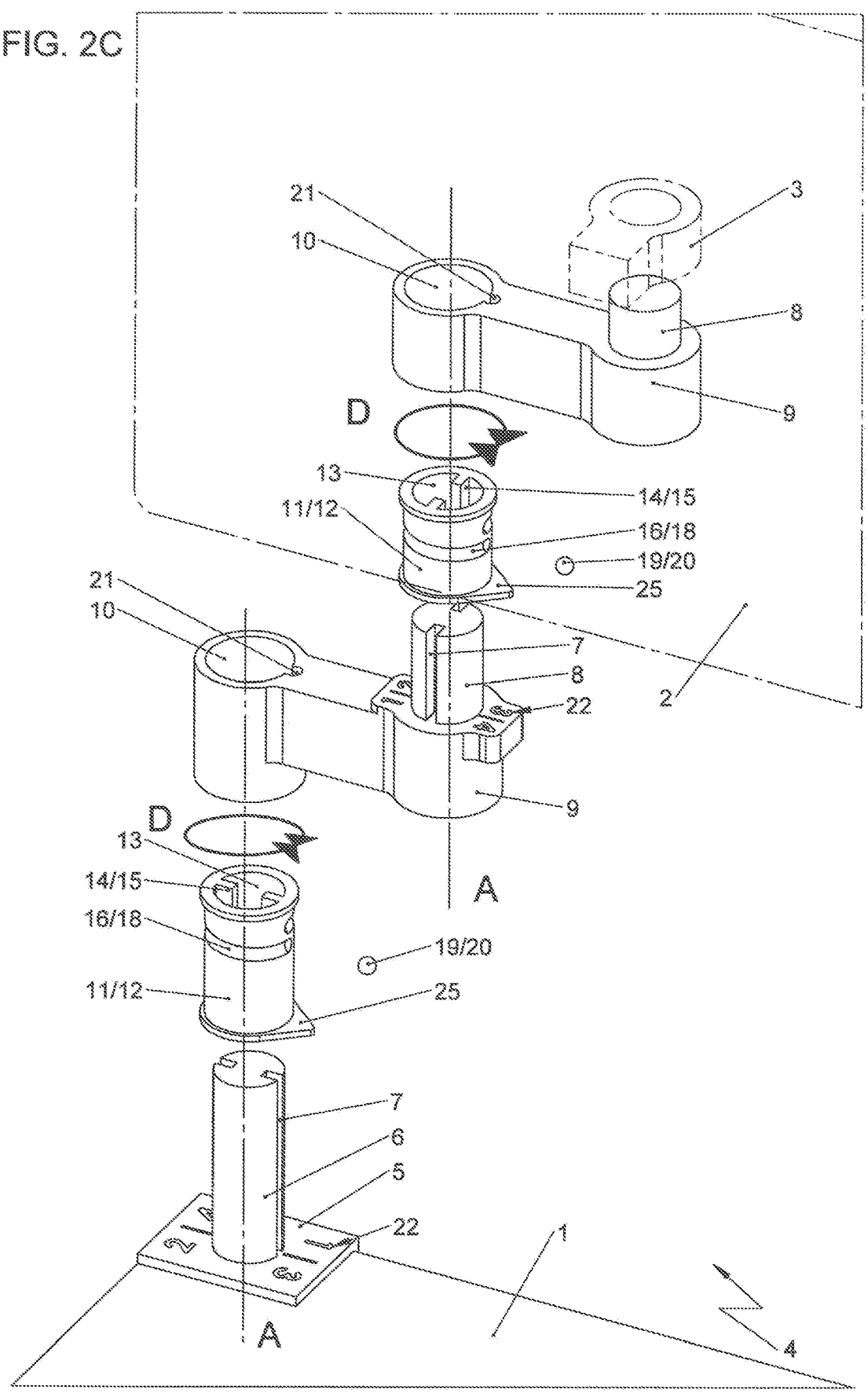

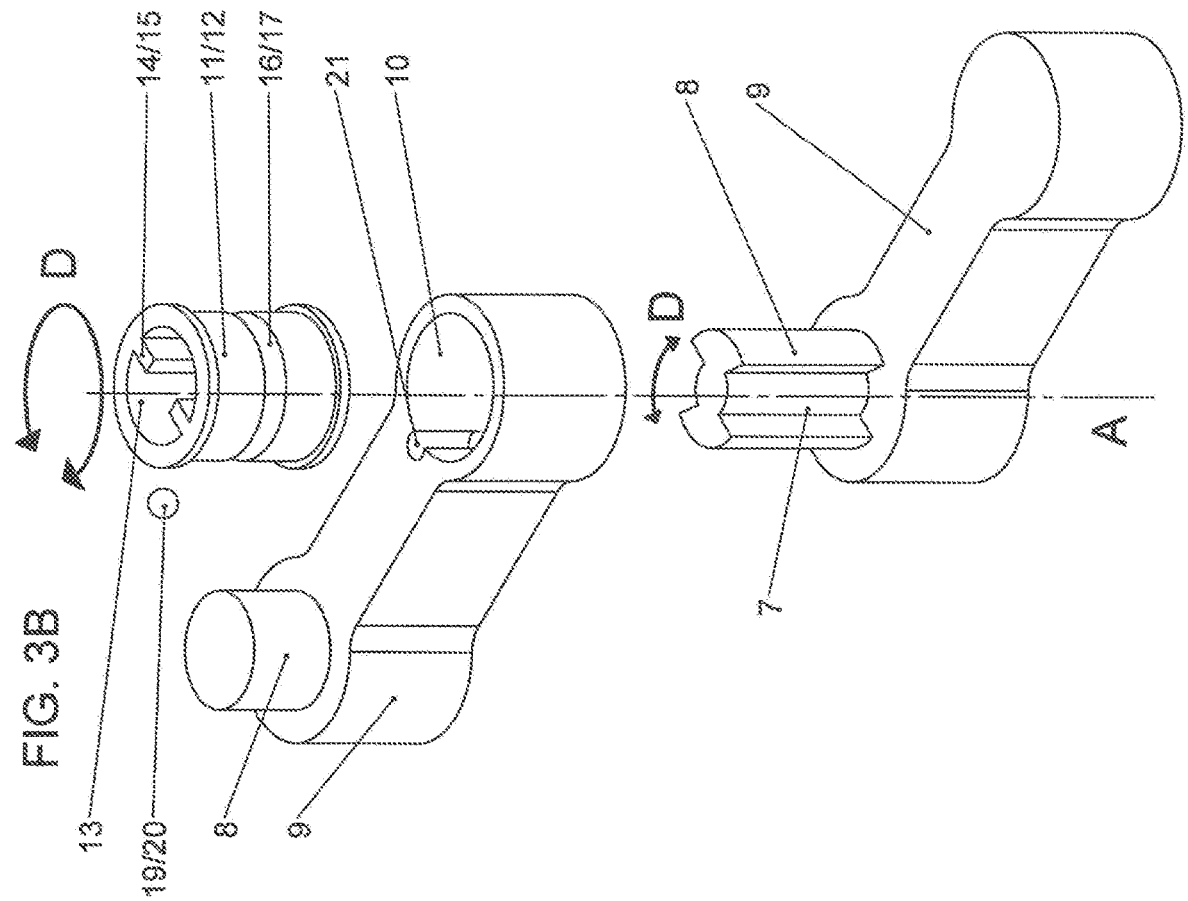
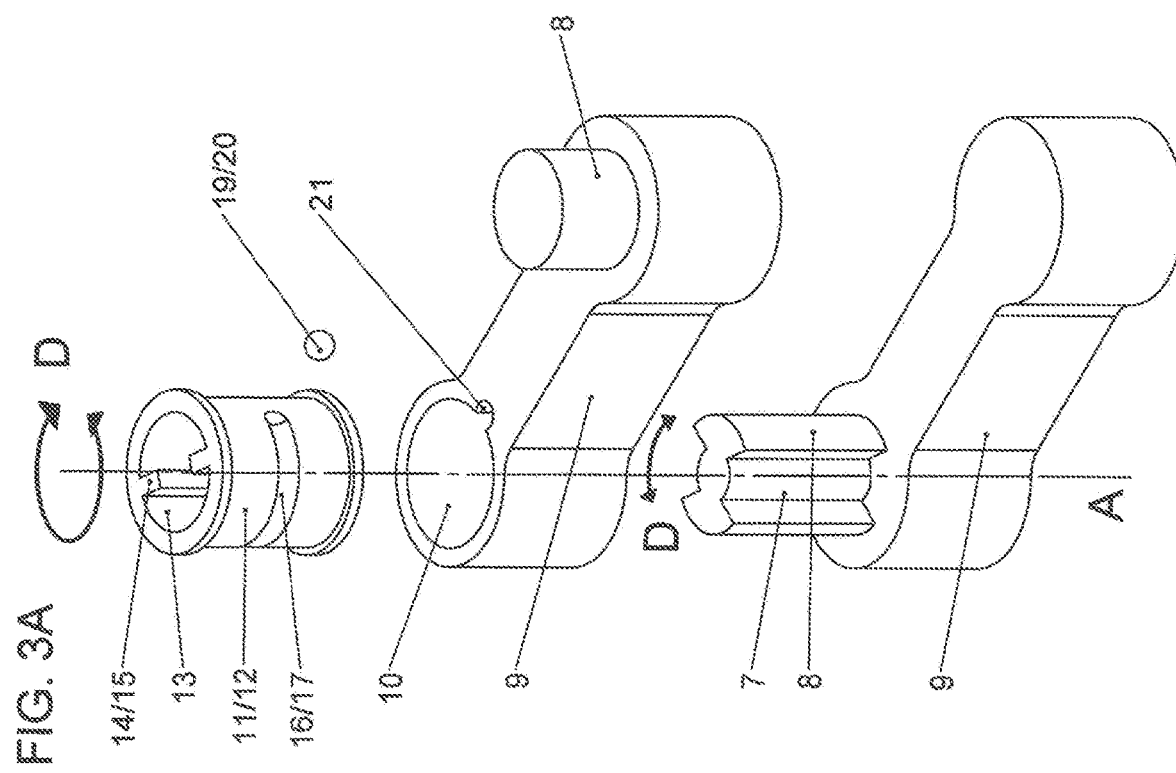

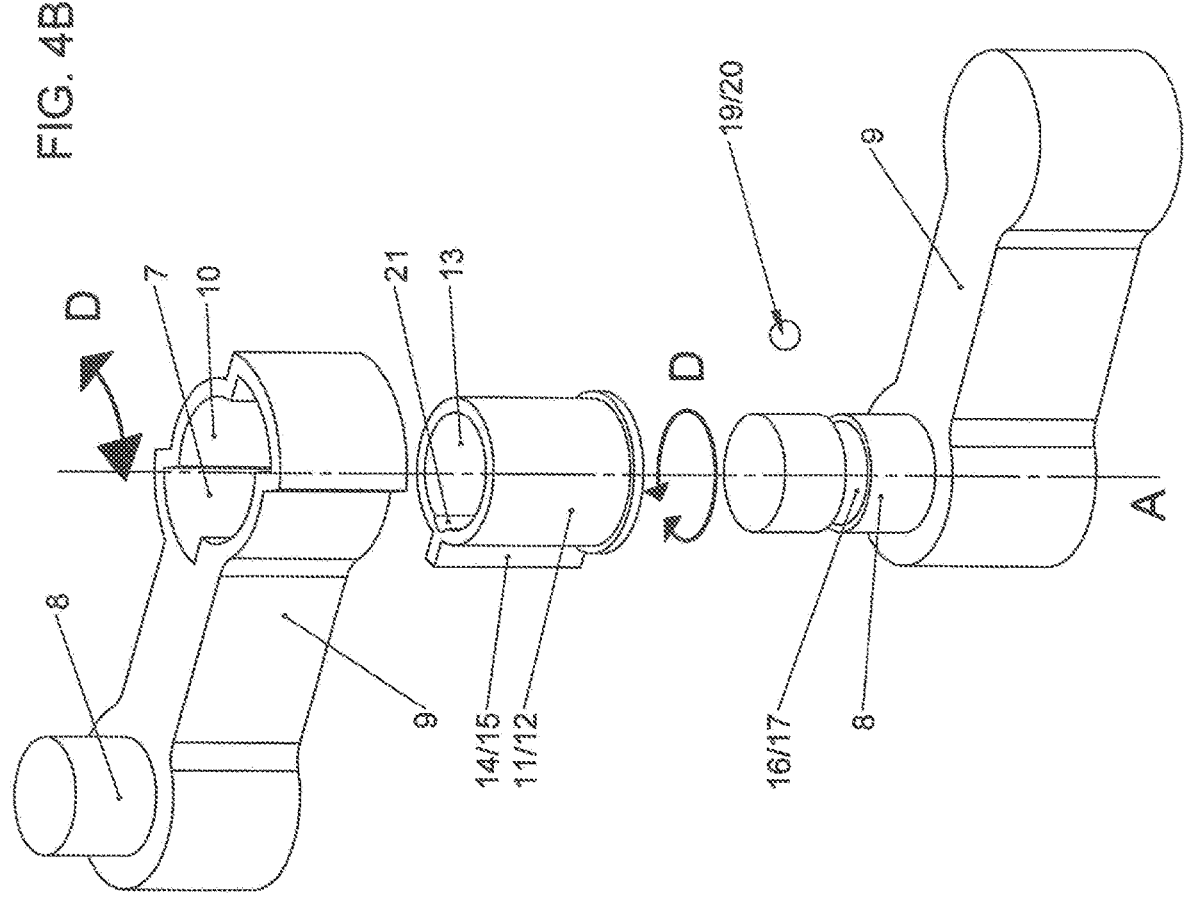
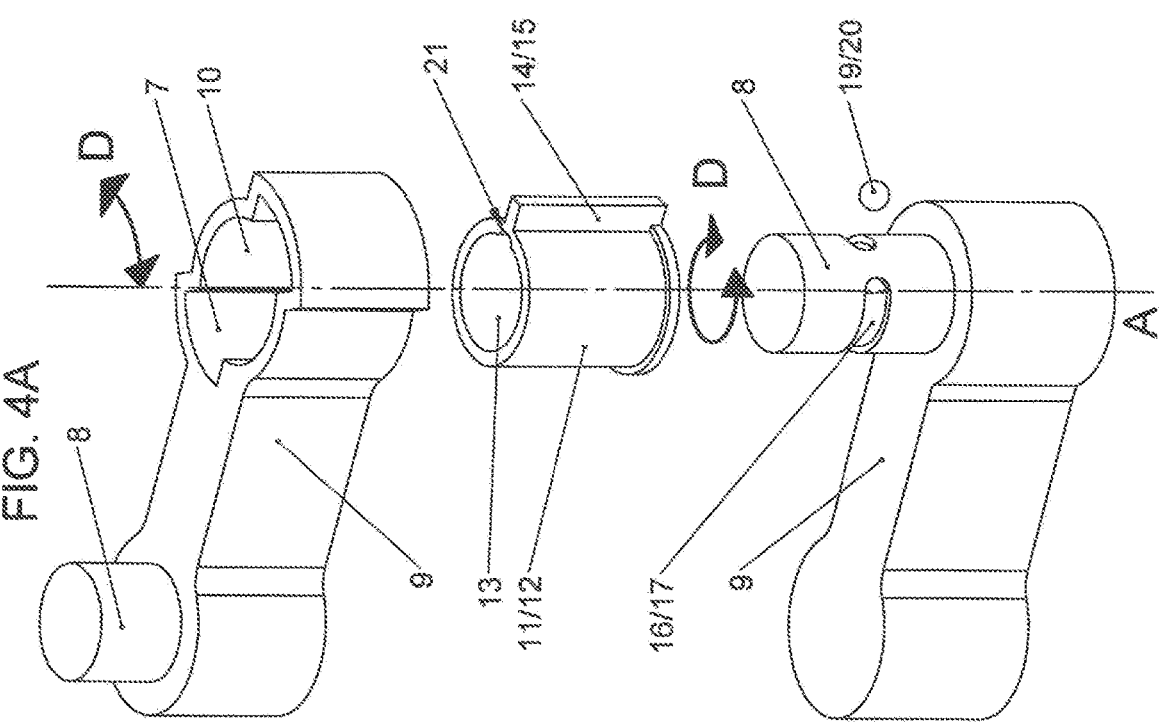

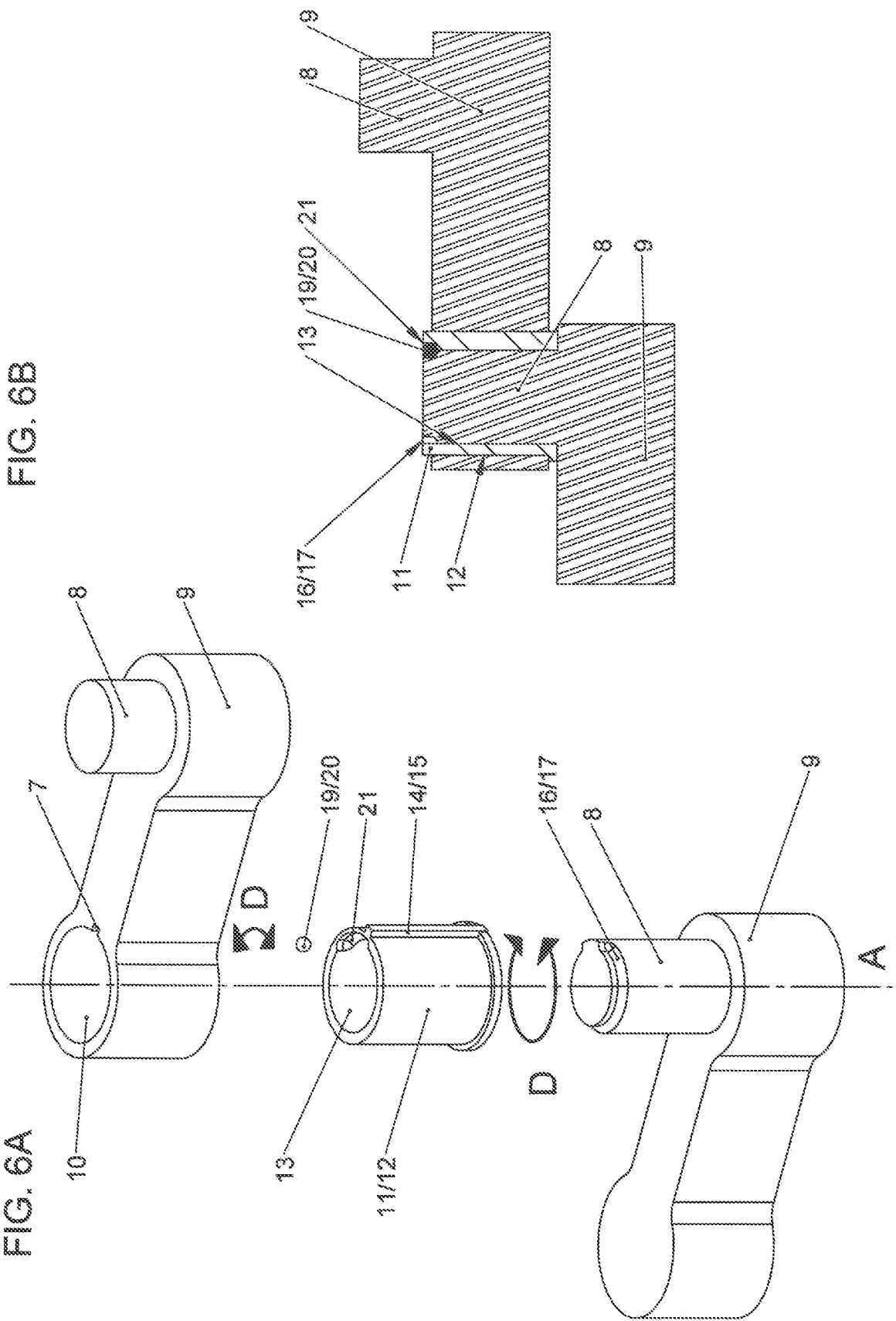

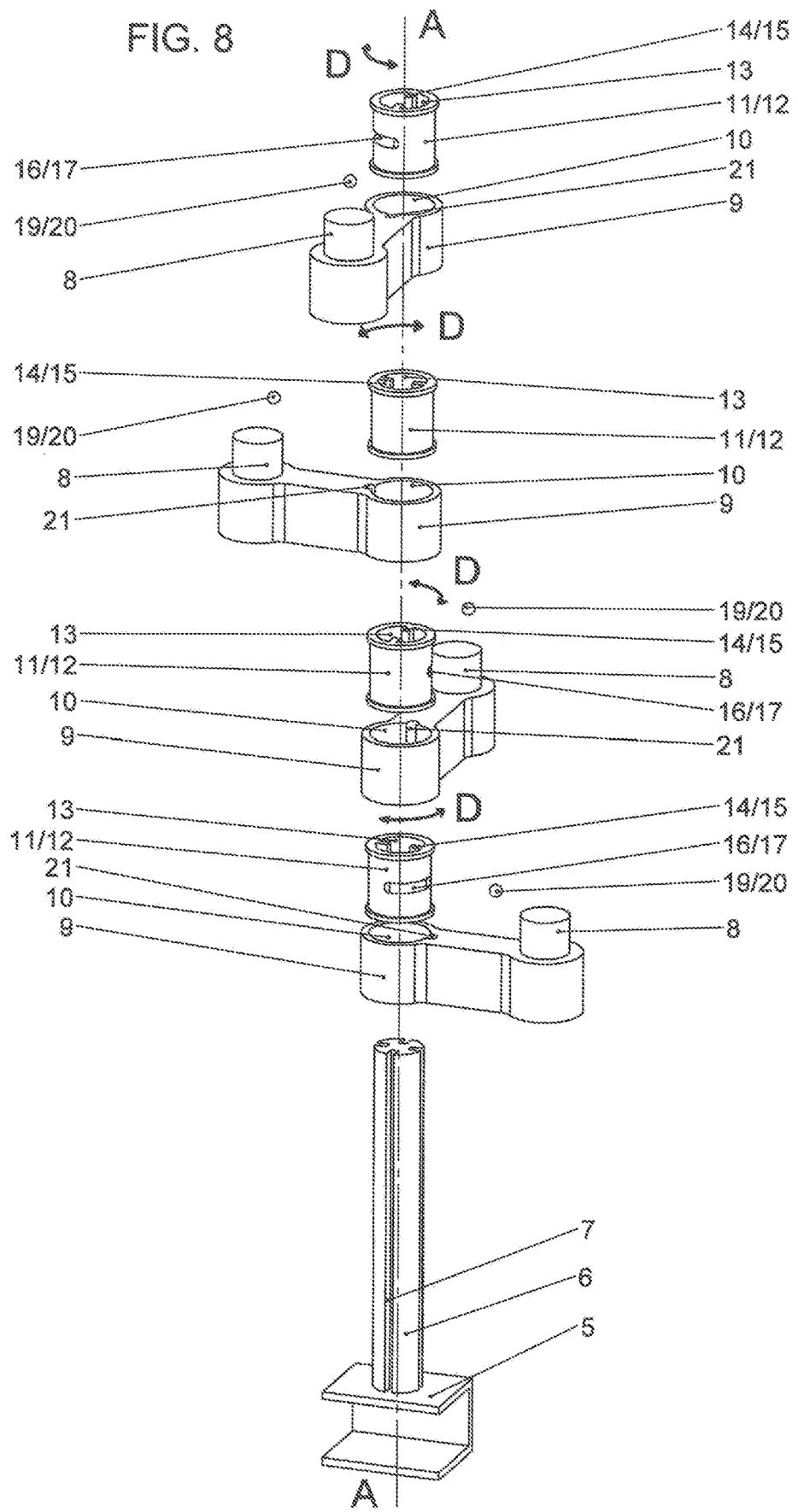

COUPLING AND COUPLING SYSTEM FOR SWIVABLY COUPLING AN ARM TO A POST, IN PARTICULAR FOR COUPLING A MONITOR ARM TO A SUPPORT

RELATED APPLICATIONS

This application is a 35 U.S.C. § 371 national phase application of PCT/NL2017/050742 (WO 2018/093256), filed on Nov. 17, 2017, entitled "Coupling and Coupling System for Swivably Coupling an Arm to a Post, in Particular for Coupling a Monitor Arm to a Support", which application claims priority to Netherlands Application No. 2018877, filed May 9, 2017, and PCT/NL2016/050798, filed on Nov. 17, 2016, each of which is incorporated herein by reference in its entirety.

The invention generally relates to a coupling for swivably coupling an arm to a post, in particular for coupling a monitor arm to a support, for example for swivably coupling a monitor arm to a post of a desk monitor stand or a wall monitor mount. Monitor supports are well known, and are used to position monitors, typically flat panel displays, at a desired viewing position on a desk or a wall. Typically, a monitor support comprises a post that extends along a longitudinal axis, a monitor arm for supporting a monitor radially outward relative to the longitudinal axis of the post, and a coupling with which the monitor arm in use is swivably coupled to the post. The post may e.g. be supported on a desk or wall, directly via e.g. a clamp or plate, or indirectly via e.g a further arm.

Monitor stands may in practice be fairly complex in their configuration, and may include several posts. A desk monitor stand may e.g. include a first post that is embodied as a main column that is supported by the desk, and that swivably carries a monitor arm via a coupling. Such first post may include a mounting track so that, in addition to a swivel angle of the monitor arm, the position of the arm on the longitudinal axis of the post may be set to position the monitor at a desired height above the desk. A desk monitor stand may also include a post that is embodied as an intermediate post, e.g. in case of an articulated monitor arm that includes two arms that are swivably connected to a common post via a coupling, e.g. to increase the reach of the stand.

Also, the configuration of a monitor stand may further be complicated because the monitor stand may have multiple monitor arms, e.g. a single post that is embodied as a main column may carry two or more separate arms to allow different monitors carried on the stand to each service another desk, or to allow more monitors to be placed in a compound viewing plane of a single desk. A post need not always extend upright, but may e.g. also extend transversely, e.g. in case of a monitor support that is embodied as a wall mount or a (cross)bar.

Typically, upon manufacture or installation a monitor support needs to be configured so that its arm services a specific area, e.g. depending on the position of the stand on the desk. This way, it can be prevented that the monitor can touch a back wall, or a left or right side wall during adjustment. Also, it may be prevented that a monitor reaches outside a service area into another service area, e.g. a service area of an adjoining desk. This is typically done by using complex mechanisms and specific parts to control swiveling of the arms about the posts.

Often an existing monitor support needs to be reconfigured so that its arm can service a new service area, e.g. when the stand is moved to a different position on a desk, to a different desk, or when a stand is reconfigured to carry a different number of arms and/or monitors.

Due to the complexity, monitor arm stands are relatively costly to manufacture, and (re)configuration involves a relatively complex operation, which typically requires tools and/or substitution of parts. The invention aims to provide a coupling for swivably coupling an arm to a post, in particular for swivably coupling a monitor arm to a post of a monitor support, with which these problems are alleviated. In particular, the invention aims to provide a coupling for swivably coupling an arm to a post that allows configuration and re-configuration in a simple operation, without requiring substitution of parts and/or tools, and that is inexpensive to manufacture. Thereto, the invention provides a coupling for swivably coupling an arm to a post, the coupling in use cooperating with the post as an engaged element via a post interface, and with the arm as an engaged element via an arm interface, wherein the coupling including its interfaces provides limited relative rotational movement between the arm and the post about a swivel axis extending along a longitudinal axis of the post, wherein the limited rotational movement is provided in a rotational zone that corresponds to a single revolution about the longitudinal axis.

By providing relative rotational movement via the coupling and/or its interfaces that is limited, and in a rotational zone that corresponds to a single revolution, a construction is obtained that is simple and that allows for easy reconfiguration.

The limited relative rotational movement may be provided in one of the interfaces, or in both interfaces. As an alternative or in addition, it may also be provided within the coupling itself.

The limited relative rotational movement provided by the coupling and its interfaces may be provided in rotational sub zones that in one orientation of the coupling are less than a single revolution, and that through reorientation of the coupling about its swivel axis relative to arm and/or post together correspond to a single revolution. In such case, the coupling can in a specific orientation not complete a full revolution, but facilitates through reorientation that the work area can be selected from rotational sub zones that together correspond to a full revolution.

A single revolution as meant herein is a about a full turn. It preferably corresponds to 360 degrees, but may in practice be slightly more or slightly less, e.g. more than 330 or 345 degrees, and less than 375 or 390 degrees.

The post interface and the arm interface may comprise a rotation limiter that in use limits rotational movement of the interface relative to its engaged element about a swivel axis that extends along a longitudinal axis of the post. At least one of the post interface and the arm interface may include a non-fixating rotation limiter that in use engages its engaged element with a limited rotational stroke to allow limited relative rotation about the swivel axis between the arm and the post.

By providing a coupling that includes a rotation limiter on both the post and the arm interface, at least one of which is non-fixating with limited stroke, swiveling of the arm about the post may be controlled relatively easily, and (re)configuration can be simplified using a relatively inexpensive part.

The coupling may comprise a substantially cylindrical body portion that extends along the swivel axis. A radial inner mantle surface of the body portion may be part of the post interface, and a radial outer mantle surface of the body portion may be part of the arm interface. This way, the coupling may form a bushing arranged between the post and the monitor arm. This allows for a simple and elegant construction. Such coupling bushing may be manufactured from plastics material e.g. through injection molding. The coupling bushing may be a single part, but may also be composed of several parts. By arranging the other of the post interface and the arm interface to include a fixating rotation limiter that in use rotationally fixedly engages its engaged element to prevent relative rotation about the swivel axis, a coupling may be provided of simple operation, and with which (re)configuration can be intuitive.

By arranging both the post interface and arm interface to include a non-fixating rotation limiter, a coupling may be provided with which swiveling of a single, complete rotation of 360° can be obtained relatively easily, through aggregation of the limited free strokes at both interfaces. Both non-fixating rotation limiters may then have the same swivel axis.

By arranging the rotation limiter to be reversibly adjustable between a non-fixating and a fixating position, (re)configuration may be simplified further.

By arranging the rotation limiter to include a protrusion, construction and (re) configuration may be simplified further. The protrusion may extend radially relative to the swivel axis, e.g. radial inwardly when arranged at the post interface, and radial outwardly when arranged at the arm interface. The protrusion may extend parallel to the swivel axis. Elegantly, the protrusion may be embodied as a tab that is arranged to engage a corresponding slot in the engaged element at the interface that also extends parallel along the swivel axis. The slot may in swiveling direction about the longitudinal axis be of matching size to receive the tab without play so as to form a fixating rotation limiter. As an alternative, the slot may in swiveling direction be oversized to receive tab with play to form a non-fixating rotation limiter with limited stroke.

The coupling may include at least two protrusions, each having a slot to increase stability. Elegantly, more slots are provided than protrusions, so that for each protrusion one out of more slots may be selected to engage. This facilitates (re)configuration of the coupling without the need to substitute parts.

In particular, the coupling may be arranged to engage the post and the arm in two or more discrete rotational orientations about the swivel axis relative to the arm and/or the post, each orientation allowing limited relative rotation about the swivel axis along a different trajectory, corresponding to a rotational sub zone. To facilitate its discrete rotational orientations, the coupling may be engageable on the post in different positions about its axis, and/or it may be reversible upside down.

By embodying the rotation limiter to include a groove that in use cooperates with the engaged element at the interface via a traveler, a reliable non-fixating rotation limiter may be provided at low cost.

The traveler may be embodied as an intermediate element between the engaged elements at the interface. As an alternative, the traveler may also be part of the engaged element at the interface, e.g. a finger.

Elegantly, the groove is a ball race, and the traveler is a ball. This way, a non-fixating rotation limiter may be provided that is inexpensive, has good running properties, and that can easily be made adjustable.

The groove may extend about the swivel axis less than 360°, and can e.g. form a ring segment. The coupling may include two or more such grooves, each of different angular orientation with respect to the swivel axis.

The groove may also extend about the swivel axis 360° or more, and can then e.g. form a helix.

The invention also relates to a coupling system comprising a post and an arm, and a coupling as discussed above. The system may be sold as a kit. In assembled condition the post interface may engage the post, and the arm interface may engage the arm.

The arm may be provided with a recess for receiving the arm interface of the coupling. The arm may e.g. comprise a further coupling for receiving a monitor.

The arm may comprise an adjustable stop, e.g. a track with one or more stop screw(s) that may be used to limit or prevent travel of the ball in the groove.

The post may be provided on a further arm. This way, a reliable articulated arm may be formed cost effectively, that can also be (re)configured in a simple operation by e.g. lifting the coupling up from the post along the swivel axis, rotationally reorienting the coupling relative to the post, and pushing the coupling back down on the post along the swivel axis.

The post may be provided with a clamp, e.g. in case of a desk mount.

The invention also relates to a monitor support comprising at least one post that extends along a longitudinal axis, a monitor arm for supporting a monitor radially outward relative to the longitudinal axis of the post, and at least one coupling as discussed above with which the monitor arm is in use swivably coupled to said post.

The post of the monitor support may be embodied as a first post and/or as an intermediate post.

The coupling may reliably be held in an aperture in the monitor arm, e.g. a substantially ring-shaped aperture that in use at least partially surrounds the circumference of the post.

It should be noted that the technical features described above in each paragraph may each on its own be embodied in a coupling, coupling system or monitor support, i.e. isolated from the context of the paragraph in which it is described here, and separate from features described in other paragraphs, or in combination with only a number of features described in the paragraph or in combination with the features of only one or a selection of such paragraphs. In accordance with this disclosure, each of these features may thus be combined with any other feature described, in any combination.

The invention will be further elucidated on the basis of non-imitative exemplary embodiments represented in the drawings. In the drawings:

FIG. 1a shows a schematic exploded view of a first embodiment of the invention for swivably coupling an arm to a post;

FIG. 1b shows a schematic cross section of FIG. 1a differing in that the embodiment is shown in assembled condition in which the coupling couples the arm to the post;

FIG. 2a shows a schematic exploded view of a first configuration of an application of the first embodiment of the invention for swivably coupling an arm to a post;

FIG. 2b shows a schematic exploded view of a second configuration of an application of the first embodiment of the invention for swivably coupling an arm to a post;

FIG. 2c shows a schematic exploded view of a third configuration of an application of the first embodiment of the invention for swivably coupling an arm to a post;

FIG. 3a shows a schematic exploded view of a second embodiment of the invention for swivably coupling an arm to a post in which a first post has broad slots as non-fixating rotation limiters;

FIG. 3b shows a schematic exploded view of a second configuration of the second embodiment of the invention for swivably coupling an arm to a post in which a second arm, carrying a second post, has been 180° reconfigured;

FIG. 4a shows a schematic exploded view of a third embodiment of the invention for swivably coupling an arm to a post in which the configuration is kinematically inverted;

FIG. 4b shows a schematic exploded view of a second configuration of the third embodiment of the invention for swivably coupling an arm to a post in which a second arm, carrying a second post, has been 180° reconfigured;

FIG. 6a shows a schematic exploded view of a fifth embodiment of the invention for swivably coupling an arm to a post;

FIG. 6b shows a schematic cross section of FIG. 6a differing in that the embodiment is shown in assembled condition in which the coupling couples the arm to the post;

FIG. 8 shows a schematic exploded view of a seventh embodiment of the invention for swivably coupling an arm to a post in which the post includes four slots.

It should be noted that the figures are merely schematic representations of preferred embodiments of invention. In the figures, identical or corresponding parts are represented with the same reference numerals.

Figure 2D:
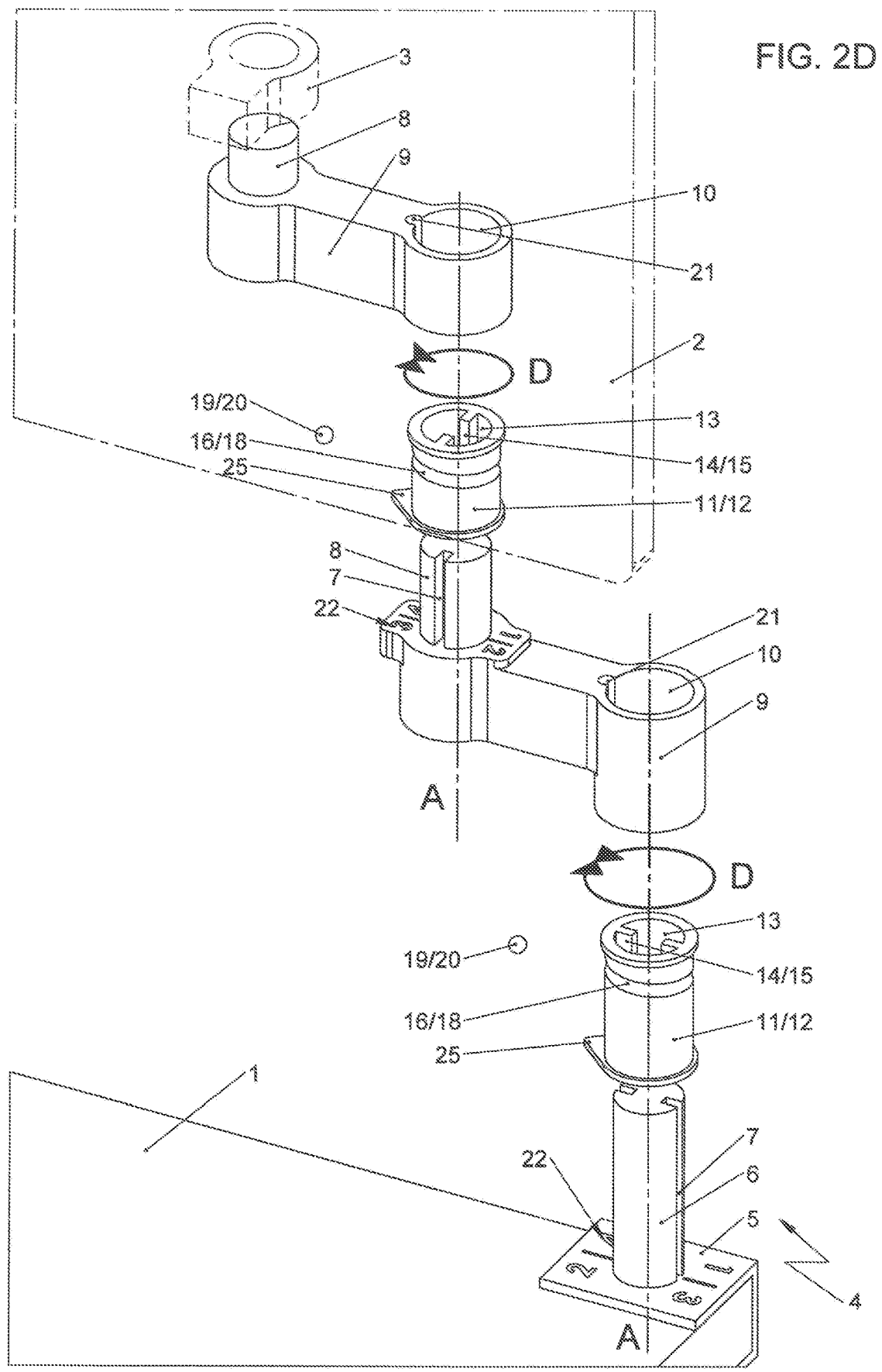
FIG. 2d shows a schematic exploded view of a fourth configuration of an application of the first embodiment of the invention for swivably coupling an arm to a post.

Referring to FIGS. 1a and 1b, a first embodiment of the invention is shown including a coupling 11 for swivably coupling an arm 9 to a post 6. The coupling 11 cooperates with the post 6 as an engaged element via a post interface 13, and with the arm 9 as an engaged element via an arm interface 12. The coupling 11 is held in a substantially ring-shaped aperture 10 that surrounds the circumference of the post 6. The coupling 11 comprises a substantially cylindrical body portion that extends along the swivel axis A and that forms a single part bushing that is arranged between the post 6 and the monitor arm 9.

The post interface 13 includes a radial outer mantle surface of the post 6, and a radial inner mantle surface of the body portion of the coupling 11. The arm interface 12 includes a radial outer mantle surface of the body portion of the coupling 11, and a radial inner mantle surface of the arm 9. Both the post interface 13 and the arm interface 12 comprise a rotation limiter that in use limits rotational movement of the interface relative to its engaged element about a swivel axis A that extends along a longitudinal axis of the post 6.

The rotation limiter on the post interface 13 here is a fixating rotation limiter which includes a protrusion 14. The protrusion is embodied as a tab 15 that extends radially inwardly, from the inner mantle surface of the coupling 11, towards the swivel axis A. The tab 15 is arranged to engage a corresponding slot 7 of matching size in the post 6, that also extends parallel along the swivel axis A.

The rotation limiter on the arm interface here is a non-fixating rotation limiter that in use engages with the arm 9 with a limited rotational stroke to allow limited relative rotation about the swivel axis A between the arm 9 and the post 6.

The non-fixating rotation limiter comprises a helical groove 18, on the outer mantle surface of the coupling 11, that in use cooperates with the arm 9 via a traveler 19. The groove 18 is embodied as a ball race that extends about the swivel axis A in a helical path of 360°, and that forms a ring segment. The traveler 19 is embodied as a ball 20, which is held in a drop-in slot 21 at the aperture 10 in the arm. Via the non-fixating rotation limiter formed by the ball 20 and groove arrangement 18, a limited rotational movement is provided in a rotational zone that corresponds to a single revolution about the longitudinal axis A.

Referring to FIGS. 2a, 2b, 2c and 2d, an application of the first embodiment of the invention is shown that forms a monitor support 4 that is embodied as a monitor desk mount. It includes a post 6 that is provided with a clamp 5. The desk clamp 5 is mounted substantially in the middle of a rear edge of a desk 1. On the post 6 that is carried on the clamp 5 a configuration is mounted that basically corresponds to the first embodiment discussed above, but that differs in the use of two protrusions 14, and two slots 7. The post 6 on the clamp 5 forms a first post 6 of the monitor support 4, about which a lower arm 9 may be swivably coupled via a first coupling 11. The end of the lower arm carries a second post 8, about which an upper arm 9 is swivably coupled via a second coupling 11 to form an articulate monitor arm. The second coupling 11 is identical to the first coupling 11 (except for its height), and the intermediate post 8 is configured similar to the first post 6 to match the coupling 11. The free end of the upper arm 9 carries a further post 8, and a swivel bracket 3 which carries a monitor 2.

FIG. 2a shows a first configuration in which the groove 18 and ball 20 of both the first and second coupling 11 cooperate to limit rotation when the upper and lower arms 9 overlap, i.e. cooperate to act as an end-stop against further rotation. This can be used to protect a back wall when a monitor 2 in front of the user is pushed away, see arrows D. Clockwise movement of the lower arm 9 about the first post 6 is free for 360 degrees, and so is counterclockwise movement of the upper arm 9 relative to the intermediate post 8.

FIG. 2b shows a second configuration that corresponds to FIG. 2a, but that differs in that the first coupling 11 has been reoriented by lifting it off the first post 6, rotating it together with the lower arm 9 180 degrees about the swivel axis A relative to the post 6, and replacing it on the post 6. The upper arm 9 has been readjusted by rotating it 360 degrees about the intermediate post 8, so that it again overlaps the lower arm 9, but now both arms 9 are located on the left of the first post 6 instead of on the right as they did in FIG. 2a. The rotation limiters now cooperate to limit rotation equal to FIG. 2a. i.e. when the arm 9 is in front of a user and a monitor 2 is pushed away. However, now counterclockwise movement of the lower arm 9 about the first post 6 is free for 360 degrees, and so is clockwise movement of the second arm 9 about the intermediate post 8. The different situations in the drawings can be recognized by looking at the directions of the situation locators 25, and the arrows D. With this way of reconfiguring and readjusting, the articulate arm 4 can be set for specific situations, without using tools or without using different parts. Alternatively, the configuration of FIG. 2a can be brought into the configuration of FIG. 2b, by changing the 180° reorientation into a 180° readjusting step in assembled condition. In this case the lower arm 9 will not be rotation limited, but gives free clockwise rotational movement and does not protect against movement to a back wall.

FIG. 2c shows a third configuration that corresponds to FIG. 2a, but that differs in that the monitor stand 4 has been relocated with its desk clamp 5 to a left corner of a desk 1. As an alternative to a clamp 5, the desk may be provided with a corner grommet mount. The configuration further differs in that the upper arm 9 carried by the second post 8 has been reconfigured by lifting the second coupling 11 up from the second post 8 along the swivel axis, rotationally reorienting the coupling 11 by 180° about the swivel axis A relative to the post 8, and pushing the coupling 11 back down on the post 8 along the swivel axis. The upper arm 9 and the lower arm 9 no longer overlap, but extend away.

The rotation limiters now cooperate to limit rotation to protect the back wall. Clockwise movement of the lower arm 9 about the first post 6 is free for 360 degrees, and so is clockwise movement about the intermediate post 8.

FIG. 2d shows a fourth configuration that corresponds to FIG. 2c, but differs in that the configuration is relocated with its desk clamp 5 to a right corner of a desk 1. The configuration further differs in that the lower arm 9 carried by the first post 6 provided with a clamp 5 has been reconfigured by lifting the first coupling 11 up from the first post 6 along the swivel axis A, rotationally reorienting the coupling 11 by 180° about the swivel axis A relative to the post 6, and pushing the coupling 11 back down on the post 6 along the swivel axis A. The upper arm 9 carried by the intermediate post 8 on the lower arm 9 has been readjusted in assembled condition. Readjusting has been done by adjusting the rotational orientation of the upper arm 9 by 360° about the swivel axis A. The lower and upper arms 9 extend away as in FIG. 2c, but now towards the left instead of towards the right as they did in FIG. 2c. The rotation limiters now cooperate to limit rotation to protect the back wall. Counterclockwise movement of the lower arm 9 about the first post 6 is free for 360 degrees, and so is counterclockwise movement about the intermediate post 8.

Referring to FIGS. 3a and 3b, a second embodiment of the invention is shown in which a non-fixating rotation limiter is formed at the post interface 13 by a slot 7 in the post 8 that is oversized in swiveling direction, and that receives the tab 15 with play. Together with the non-fixating rotation limiter formed by the ring segment 17 in the outer mantle surface of the coupling 11 at the arm interface 12, a rotation limiter with a compound stroke of 360 degrees is obtained. Rotation is limited when the arms 9 overlap.

FIG. 3b shows a second configuration that corresponds to FIG. 3a, but differs in that the upper arm 9 carried by the post 8 has been reconfigured by lifting the coupling 11 up from the post 8 along the swivel axis A, rotationally reorienting the coupling 11 by 180° about the swivel axis A relative to the post 8, and pushing the coupling 11 back down on the post 8 along the swivel axis A. The rotation limiters now cooperate to limit rotation when the arms 9 extend away, without using tools and using the same parts.

Referring to FIGS. 4a and 4b, a third embodiment of the invention is shown in which the configuration is kinematically inverted: the non-fixating rotation limiter on the arm interface 12 includes a racially outwardly projecting tab 15 on the outer mantle of the coupling body that cooperates with an oversized slot 7 in the arm. The non-fixating rotation limiter on the post interface 13 includes a ball race 17 in the post 8, of which the ball 20 is held in a drop-in slot 21 in the inner mantle of the bushing 11. Similar to FIG. 3a, rotation is limited when the arms 9 overlap.

FIG. 4b shows a second configuration that corresponds to FIG. 4a, but that differs in that the second (upper) arm 9 carried by the post 8 has been 180° reconfigured. Similar to FIG. 3b, the rotation limiters now cooperate to limit rotation when the arms 9 extend away.

Figure 5B:
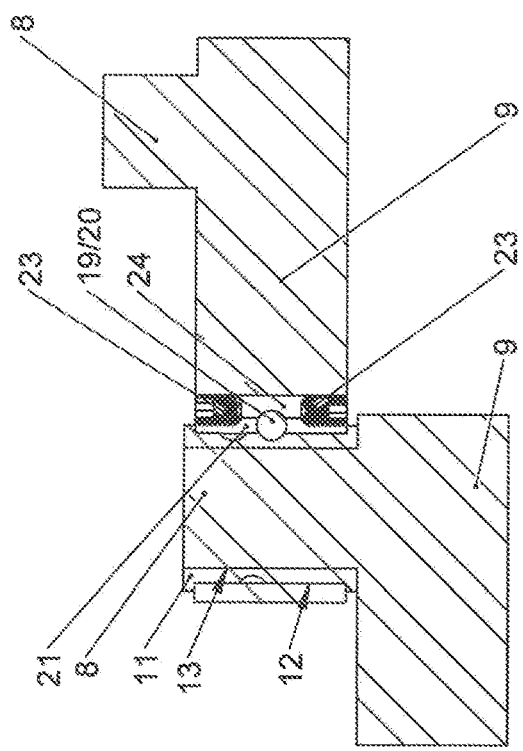
FIG. 5b shows a schematic cross section of FIG. 5a differing in that the embodiment is shown in assembled condition in which the coupling couples the arm to the post.
Figure 5A:
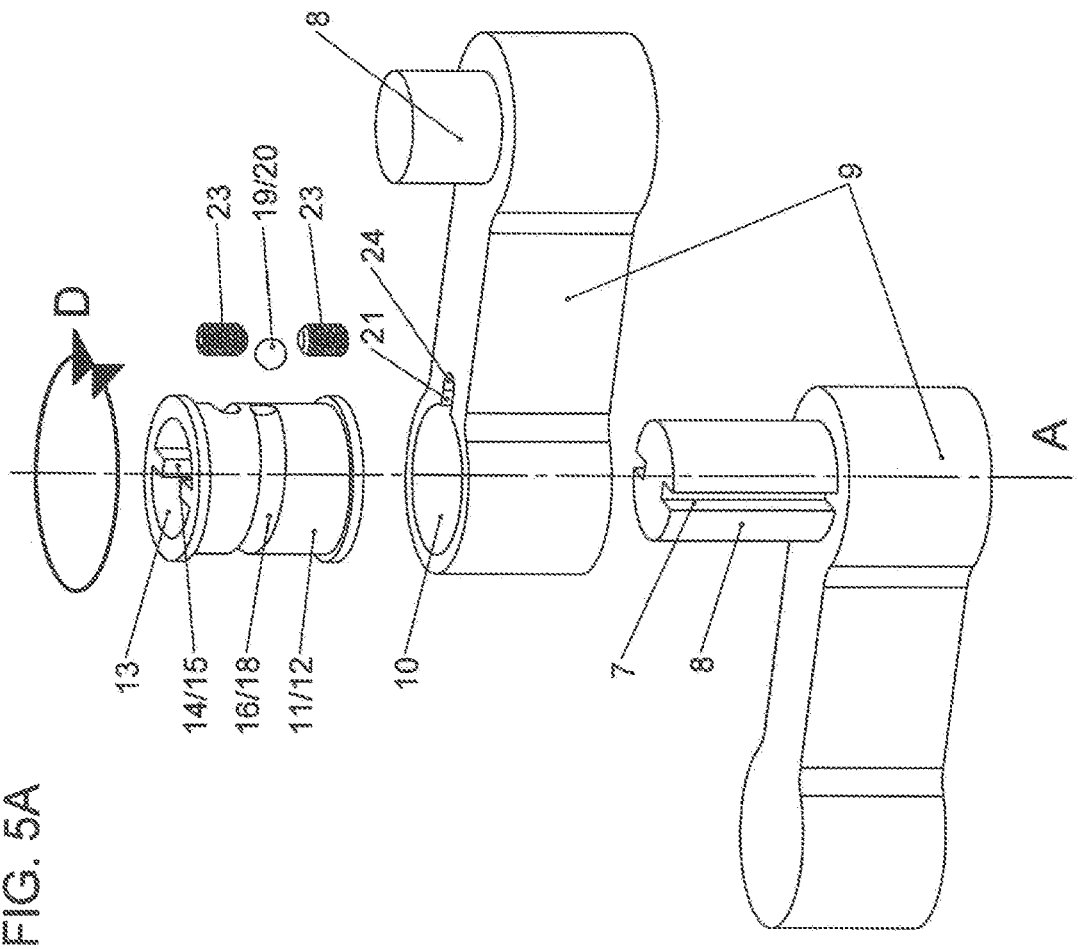
FIG. 5a shows a schematic exploded view of a fourth embodiment of the invention for swivably coupling an arm to a post in which a helical groove includes adjustable stops.

Referring to FIGS. 5a and 5b, a fourth embodiment of the invention is shown. The fourth embodiment is a variation on the first embodiment, and includes a helical groove 18 with adjustable stops 23 as a non-fixating rotation limiter. The arm 9 comprises a track with two set screws 23 that may be used to limit travel of the ball 20 in the groove 18. The set screws 23 may be provided with manually operable heads, so that they can be adjusted in a toolless operation. By locking the ball 20 between the stops screws 23, the rotation limiter can be reversibly adjusted between a non-fixating and a fixating position. As a simplification, a single stop screw 23 may be used. The end of the track 18 can then form the second stop.

Referring to FIGS. 6a and 6b, a fifth embodiment of the invention is shown in which the configuration is inverted again. Here a slot 7 is provided in the arm that matches in size with a tab 15 that extends from the coupling body at its outer mantle so as to provide a fixed rotation limiter at the arm interface 12. At the post interface 13, a rotation limiter with a compound stroke of 360 degrees is provided. A first non-fixating rotation limiter is provided by a circumferential groove 17 at the top of post 8 that cooperates with a travelling ball 20 held in the inner mantle surface of the coupling body. The circumferential groove 17 forms a circle segment of less than 360 degrees. A second non-fixating rotation limiter is formed by a circumferential groove 17 at the top of the inner mantle surface of the coupling body that also cooperates with the ball. The ball 20 is held in place by a top flange (not shown).

Figure 7B:
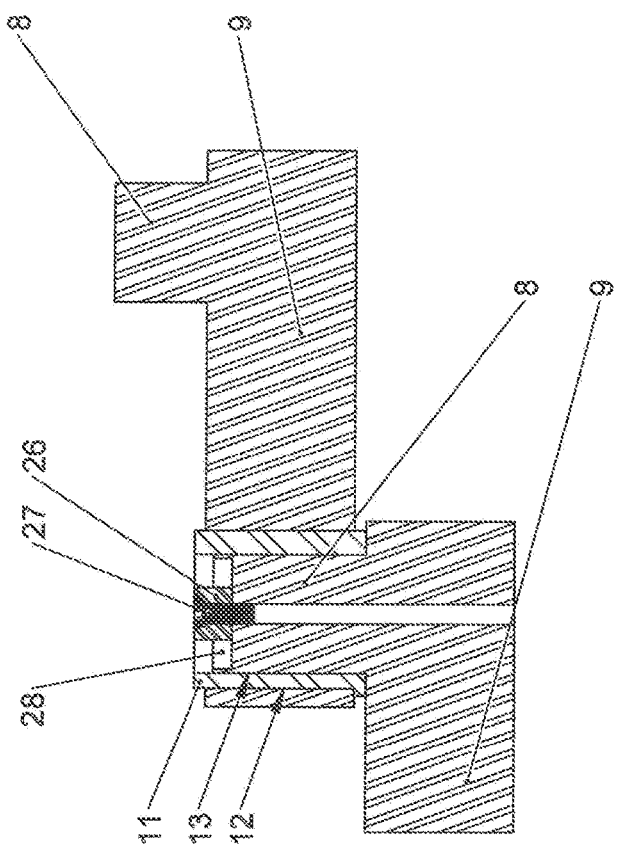
FIG. 7b shows a schematic cross section of FIG. 7a differing in that the embodiment is shown in assembled condition in which the coupling couples the arm to the post.
Figure 7A:
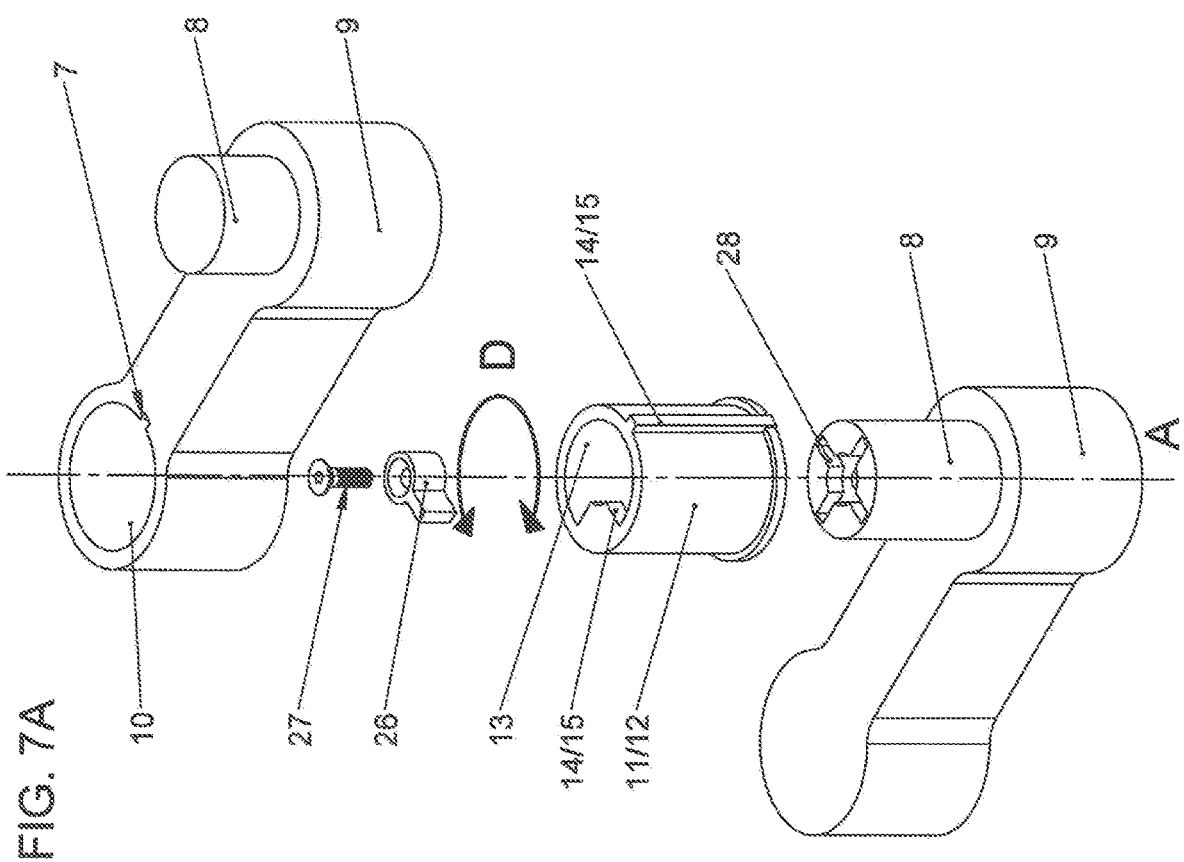
FIG. 7a shows a schematic exploded view of a sixth embodiment of the invention for swivably coupling an arm to a post.

Referring to FIGS. 7a and 7b, a sixth embodiment of the invention is shown. Here a slot 7 is provided in the arm 9 that matches in size with a tab 15 that extends from the coupling body at its outer mantle so as to provide a fixed rotation limiter at the arm interface 12. At the post interface 13, a non-fixating rotation limiter with a stroke of 270 degrees is provided, as indicated by arrow D. Thereto, the post 8 carries a finger 26 that cooperates with a 270 degree slot in a top surface of the body of the coupling 11. The finger 26 may be detached using screw 27, and may be reoriented to be held in in any of the four arms of a mounting cross 28 at the top surface of the post 8 in which the finger 26 is held.

Here the limited relative rotational movement is provided in four rotational sub zones of 270 degrees each. The rotational sub zones are each in one orientation of the coupling less than a single revolution, and through reorientation of the coupling 11 about its swivel axis A relative to the post 8 and the arm 9 together correspond to a single revolution. Through reorientation the work area can thus be selected from rotational sub zones that together correspond to a full revolution.

Referring to FIG. 8, a seventh embodiment of the invention is shown with a post 6 that includes four slots 7, and a coupling 11 that swivably couples an arm 9 to the post 6. The coupling 11 includes a fixating rotation limiter at the post interface 13 that comprises two opposing racially inwardly extending tabs 15 at the inner mantle surface of the coupling body. The tabs 15 fit into the slots 7 in the post 6, occupying two opposing slots 7 at one time. The coupling 11 further includes a non-fixating rotation limiter at the arm interface 12 that comprises a quarter circle circumferential groove 17 in the outer mantle surface of the coupling body that cooperates with the arm 9 via a travelling ball 20 held in a drop-in slot 21 in the arm 9. In FIG. 8 it is shown by depicting four identical couplings 11 and arms 9, that through reorientation of the coupling 11 relative to the post 6 by rotating it 90 degrees about its swivel axis A, the work area of the arm 9 can be selected from four 90 degree rotational sub zones that together correspond to a full revolution. Up to four arms 9 can be swivably coupled to the post 6 using the same type of coupling 11, each arm 9 having its own quadrant of service.

The coupling disclosed herein may summarily be expressed as a coupling for swivably coupling an arm to a post, the coupling comprising a post interface that in use cooperates with the post as engaged element, and an arm interface that in use cooperates with the arm as engaged element, wherein both the post interface and the arm interface comprise a rotation limiter that in use limits rotational movement of the interface relative to its engaged element about a swivel axis that extends along a longitudinal axis of the post. At least one of the post interface and the arm interface may include a non-fixating rotation limiter that in use engages its engaged element with a limited rotational stroke to allow limited relative rotation about the swivel axis between the arm and the post.

The invention is not limited to the exemplary embodiments represented here, but include variations. For example, the coupling may be assembled of various pieces, and may e.g. be built up from two parts that cooperate via wedge surfaces such as described in PCT/NL2016/050798. Also, the angular values discussed may be chosen differently, and the shape and configuration of the arms and the posts may vary. Examples of shapes and configurations of monitor arm stands are also described in PCT/NL2016/050798. Such variations shall be clear to the skilled person and are considered to fall within the scope of the invention as defined in the appended claims.

LIST OF REFERENCE SIGNS 1. desk
2. monitor
3. swivel bracket for monitor
4. monitor arm stand
5. clamp
6. post embodied as column
7. longitudinally extending slot
8. post embodied as coupling post
9. monitor arm
10. mounting aperture of monitor arm
11. coupling
12. monitor arm interface of coupling
13. post interface of coupling
14. protruding rotation limiter
15. tab
16. depressed rotation limiter
17. circumferential groove
18. helical groove
19. traveler
20. ball
21. slot of traveler
22. configuration situations
23. set screw
24. recess of set screw
25. situation locator
26. directional finger
27. screw of finger
28. mounting cross
A swivel axis
D swivel direction

The invention claimed is:

1. A coupling for swivably coupling an arm to a post, the coupling comprising a substantially cylindrical body portion forming a bushing to be arranged between the post and the arm and in use cooperating with the post as an engaged element via a post interface, and with the arm as an engaged element via an arm interface, wherein the coupling including its interfaces provides limited relative rotational movement between the arm and the post about a swivel axis extending along a longitudinal axis of the post, wherein the limited relative rotational movement is provided in a rotational zone that corresponds to a single revolution about the swivel axis and wherein at least one of the post interface and the arm interface comprises a rotation limiter that in use limits relative rotational movement of the at least one of the post interface and the arm interface relative to its respective post or arm engaged element about the swivel axis by means of an end-stop preventing further rotation, and wherein the coupling is arranged to engage the post or arm in two or more axial rotation positions relative to the post or arm about the swivel axis providing corresponding axial rotation of the rotational zone and the rotation limiter by disengaging the coupling from the post or arm from a first of the two or more axial rotation positions and axially rotating the coupling relative to the post or arm to a second of the two or more axial rotation positions and reengaging the post and arm.

2. The coupling of claim 1, wherein the at least one of the post interface and the arm interface includes a rotation limiter that is a non-fixating rotation limiter that in use engages its engaged element with a limited rotational stroke to allow limited relative rotation about the swivel axis between the arm and the post.

3. The coupling of claim 1, wherein the rotation limiter includes a protrusion.

4. The coupling of claim 1, wherein the rotation limiter includes a groove that in use cooperates with the engaged element via a traveler.

5. The coupling of claim 1, wherein the coupling is arranged to engage the post and the arm in two or more discrete rotational orientations about the swivel axis relative to the arm and/or the post, each orientation allowing limited relative rotation about the swivel axis along a different trajectory.

6. A coupling system comprising a post and an arm, and a coupling according to claim 1.

7. The coupling system of claim 6, wherein the arm is provided with a recess for receiving the arm interface of the coupling.

8. The coupling system of claim 6, wherein the arm comprises an adjustable stop.

9. The coupling system of claim 6, wherein the post is provided on a further arm.

10. The coupling system of claim 6, wherein the post is provided with a clamp.

11. A monitor support comprising at least one post that extends along a longitudinal axis, a monitor arm for supporting a monitor radially outward relative to the longitudinal axis of the post, and a coupling according to claim 1 with which the monitor arm is in use swivably coupled to said post.

\* \* \* \* \*